(12) United States Patent
Yang et al.

(10) Patent No.: US 8,904,337 B2
(45) Date of Patent: Dec. 2, 2014

(54) SEMICONDUCTOR DEVICE DESIGN METHOD, SYSTEM AND COMPUTER-READABLE MEDIUM

(71) Applicant: Taiwan Semiconductor Manufacturing Company, Ltd., Hsinchu (TW)

(72) Inventors: Ching-Shun Yang, Zhudong Township (TW); Ze-Ming Wu, Tainan (TW); Hsiao-Chu Chao, Baoshan Township (TW); Yi-Kan Cheng, Taipei (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 14/200,714

(22) Filed: Mar. 7, 2014

(65) Prior Publication Data
US 2014/0189635 A1    Jul. 3, 2014

Related U.S. Application Data

(63) Continuation of application No. 13/406,108, filed on Feb. 27, 2012, now Pat. No. 8,707,245.

(51) Int. Cl.
G06F 11/22 (2006.01)
G06F 17/50 (2006.01)
G03F 7/00 (2006.01)

(52) U.S. Cl.
CPC ........ G06F 17/5081 (2013.01); *G06F 17/5036* (2013.01); *G03F 7/00* (2013.01); *G06F 2217/82* (2013.01)

USPC .......................................................... 716/136

(58) Field of Classification Search
CPC .................... G06F 14/5036; G06F 17/5022
USPC .......................................................... 716/136
See application file for complete search history.

(56) References Cited

U.S. PATENT DOCUMENTS

| | | | |
|---|---|---|---|
| 5,903,469 A | * | 5/1999 | Ho .................................. 716/115 |
| 2006/0259883 A1 | | 11/2006 | Cohen et al. |
| 2010/0199236 A1 | | 8/2010 | Chen et al. |
| 2011/0285034 A1 | * | 11/2011 | Youn et al. ..................... 257/786 |
| 2011/0301932 A1 | * | 12/2011 | Yoshitomi et al. ............... 703/14 |
| 2012/0149789 A1 | * | 6/2012 | Greenbaum .................. 518/704 |
| 2013/0091480 A1 | * | 4/2013 | Horlacher et al. ............ 716/113 |

* cited by examiner

*Primary Examiner* — Suresh Memula
(74) *Attorney, Agent, or Firm* — Lowe Hauptman & Ham, LLP

(57) ABSTRACT

A semiconductor device design system comprising at least one processor is configured to define a resistance-capacitance (RC) extraction tool for determining a distance between first and second through-semiconductor-vias extracted from a layout of a semiconductor device. The semiconductor device has a semiconductor substrate and the first and second through-semiconductor-vias in the semiconductor substrate. The semiconductor device design system comprising the at least one processor is also configured to extract parasitic parameters of a coupling in the semiconductor substrate based on the distance determined by the RC extraction tool and a model of the coupling included in a simulation tool.

20 Claims, 7 Drawing Sheets

SEMICONDUCTOR DEVICE DESIGN METHOD, SYSTEM AND COMPUTER-READABLE MEDIUM

PRIORITY CLAIM

The present application is a continuation of U.S. application Ser. No. 13/406,108, filed Feb. 27, 2012, which is incorporated herein by reference in its entirety.

BACKGROUND

The recent trend in miniaturizing integrated circuits (ICs) has resulted in smaller devices which consume less power, yet provide more functionality at higher speeds than before. The miniaturization process has also resulted in stricter design and manufacturing specifications. Pre-manufacture checking and testing are conducted to make sure that a semiconductor device can be made and will function as designed.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

Figure 1:
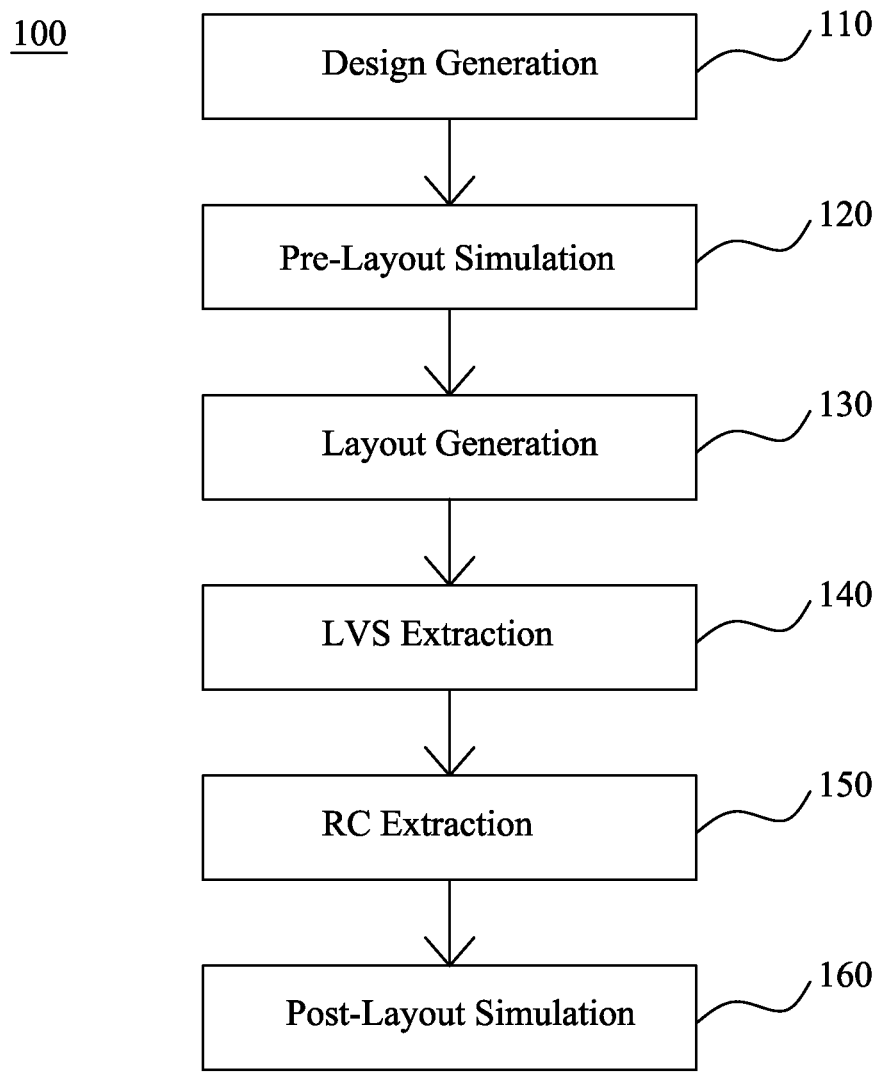
FIG. 1 is a flow chart of a part of a design flow in accordance with some embodiments.

It is to be understood that the following disclosure provides many different embodiments or examples, for implementing different features of various embodiments. Specific examples of components and arrangements are described below to simplify the present disclosure. An inventive concept may, however, be embodied in many different forms and should not be construed as being limited to the embodiments set forth herein; rather, these embodiments are provided so that this description will be thorough and complete, and will fully convey an inventive concept to those of ordinary skill in the art. It will be apparent, however, that one or more embodiments may be practiced without these specific details.

In the drawings, the thickness and width of layers and regions are exaggerated for clarity. Like reference numerals in the drawings denote like elements. The elements and regions illustrated in the figures are schematic in nature, and thus relative sizes or intervals illustrated in the figures are not intended to limit the scope of an inventive concept.

Some embodiments provide a design method and system in which parasitic parameters of a coupling between electrical components in a semiconductor substrate are extracted based on a distance between the electrical components and a model. The distance is provided by a first tool, e.g., an RC extraction tool. The model is provided by a second, different tool, e.g., a simulation tool.

FIG. 1 is a flow chart of a part of a design flow 100 in accordance with some embodiments. The design flow 100 utilizes one or more electronic design automation (EDA) tools for testing a design of a semiconductor device before manufacturing the same device.

At operation 110, a design of a semiconductor device is generated or provided by a circuit designer. In some embodiments, the design is generated or provided in the form of a netlist, such as, a Simulation Program with Integrated Circuit Emphasis (SPICE) netlist. Other data formats for describing the design are usable in further embodiments.

At operation 120, a pre-layout simulation is performed on the design to determine whether the design meets a predetermined specification. If the design does not meet the predetermined specification, the semiconductor device is redesigned. In some embodiments, a SPICE simulation is performed on the SPICE netlist generated or provided at operation 110. Other simulation tools are usable, in place of or in addition to the SPICE simulation, in other embodiments.

At operation 130, a layout of the semiconductor device is generated based on the design. In some embodiments, the layout is generated in the form of a Graphic Design System (GDS) file. Other data formats for describing the layout are usable in other embodiments.

At operation 140, a layout-versus-schematic (LVS) extraction or check, is performed. The LVS check is run to ensure that the generated layout corresponds to the design. Specifically, an LVS extraction tool recognizes electrical components as well as connections therebetween from the patterns of the layout. The LVS extraction tool then generates a netlist representing the recognized electrical components and connections. The netlist generated from the layout is compared with the netlist of the design. If the two netlists match, the LVS check is passed. Otherwise, correction is made to the layout.

In some embodiments, a design rule check (DRC) is also performed to ensure that the layout satisfies certain manufacturing design rules, i.e., to ensure that the semiconductor device can be manufactured. If one or more design rules is violated, correction is made to the layout. Other verification processes are usable in other embodiments.

At operation 150, a resistance and capacitance (RC) extraction is performed. The RC extraction is run to determine parasitic parameters, e.g., parasitic resistance and parasitic capacitance, of interconnects in the semiconductor device's layout for timing simulations in a subsequent operation. Such parasitic parameters are not intended by the circuit designer, but nevertheless occur as a result of configurations and/or materials of the patterns in the layout. In some embodiments, a technology file is used by an RC extraction tool to extract parasitic parameters. The extracted parasitic parameters are added to the netlist provided by the LVS extraction tool to output a modified netlist.

At operation 160, a post-layout simulation is performed to determine whether the layout meets a predetermined specification, taking the extracted parasitic parameters into account. Specifically, a simulation tool performs a simulation on the modified netlist outputted by the RC extraction tool. If the simulation indicates that the layout does not meet the predetermined specification, e.g., if the parasitic parameters cause undesirable delays, correction is made to the layout. Otherwise, the layout is passed to manufacture or additional verification processes. In some embodiments, the post-layout simulation is a SPICE simulation. Other simulation tools are usable, in place of or in addition to SPICE, in further embodiments.

Figure 2A:
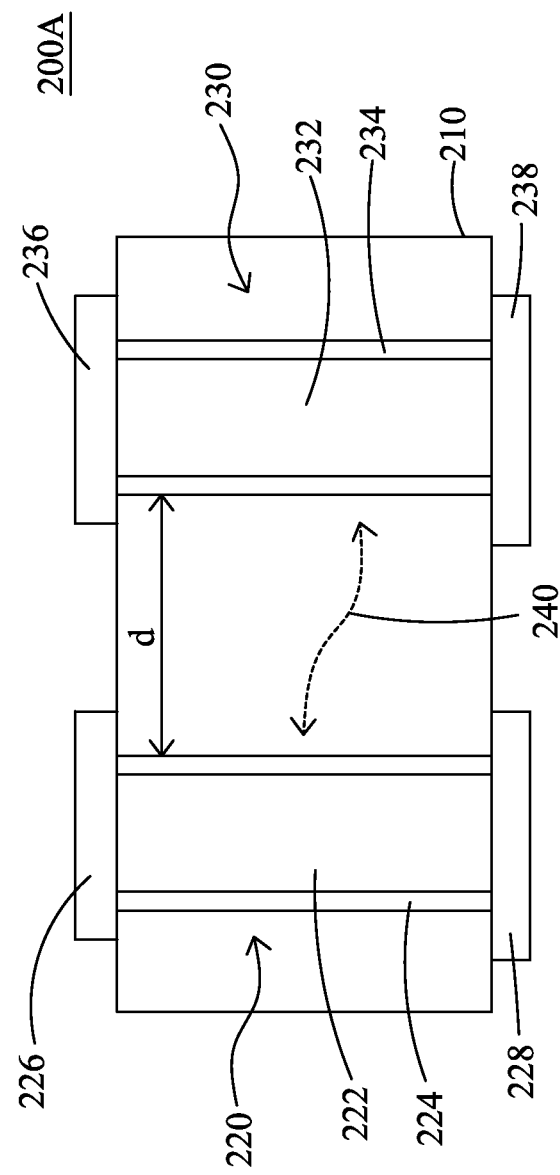
FIG. 2A is a schematic cross-section view of a semiconductor device in accordance with some embodiments.

FIG. 2A is a schematic cross-section view of a semiconductor device 200A in accordance with some embodiments. The semiconductor device 200A includes a semiconductor substrate 210, and a plurality of electrical components 220, 230 formed in the semiconductor substrate 210.

The semiconductor substrate 210, includes, but is not limited to, bulk silicon, a semiconductor wafer, a silicon-on-insulator (SOI) substrate, and a silicon germanium substrate. Other semiconductor materials including group III, group IV, and group V elements are used in some embodiments.

Each of the electrical components 220, 230 includes an active electrical component or a passive electrical component. Examples of active electrical components include, but are not limited to, transistors (e.g., metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), etc.), and diodes. Examples of passive electrical components include, but are not limited to, capacitors, inductors, fuses, resistors, and interconnects. Examples of interconnects include, but are not limited to, vias, conductive pads, conductive patterns, conductive redistribution layers.

In some embodiments, the semiconductor device 200A is an interposer to be interposed between chips (ICs) stacked one on top another in a three-dimensional integrated circuits (3D ICs). The interposer includes one or more active electrical components and/or passive electrical components 220, 230 embedded in the semiconductor substrate 210. In one or more embodiments, the interposer includes no active electrical component and is refereed to as a passive interposer. In some embodiments, the semiconductor device 200A is a chip, a chip stack which is a stack of chips one on top another, or a chip package which includes at least one chip and a carrier on which the at least one chip is mounted.

In the specific configuration in accordance with some embodiments disclosed in FIG. 2A, the semiconductor device 200A is an interposer, and the electrical components 220, 230 are through-semiconductor-vias (TSVs) extending from one side to the opposite side of the semiconductor substrate 210. The TSVs 220, 230 are arranged to define interconnect structures that interconnect the chips on the opposite sides of the semiconductor device 200A in a 3D IC structure together.

The TSV 220 includes a conductive via 222 and a liner 224 for electrically insulating the conductive via 222 from the surrounding semiconductor material of the semiconductor substrate 210. Conductive pads 226 and 228 are coupled to opposite ends of the conductive via 222 to define electrical connections to the corresponding chips in the 3D IC structure. Likewise, the TSV 230 includes a conductive via 232 and a liner 234 for electrically insulating the conductive via 232 from the surrounding semiconductor material of the semiconductor substrate 210. Conductive pads 236 and 238 are coupled to opposite ends of the conductive via 232 to define electrical connections to the corresponding chips in the 3D IC structure.

A coupling 240 exists in the semiconductor substrate 210 between the TSVs 220, 230. As noted above, the recent trend in semiconductor device manufacture and design is to reduce the semiconductor device size, while providing more functionality at higher speeds and/or frequencies. As the semiconductor device size reduces and/or the operating frequency increases, coupling noise, e.g., caused by the coupling 240, between electrical components, such as the TSVs 220, 230, increases due to, e.g., a shorter distance d between the TSVs 220, 230. Such increasing coupling noise is likely to increase signal delays and/or cause signal integrity issues. To optimize the design and/or the layout of the semiconductor device 220A to compensate for such potential undesirable effects, impact of the coupling 240 on the performance of the semiconductor device 200A is taken into account. As described with respect to FIG. 1, a parasitic parameter representing the coupling 240 is extracted by an RC extraction tool, the extracted parasitic parameter is added to a netlist outputted by an LVS extraction tool, and a post-layout simulation is performed on the modified netlist to predict potentially undesirable effects caused by the coupling 240. If the RC extraction tool considers the coupling 240 as a parasitic capacitance, the semiconductor properties of the semiconductor substrate 210 and/or coupling noise at high frequencies are not taken into account which, under certain circumstances, results in inaccurate simulation evaluations.

Figure 2B:
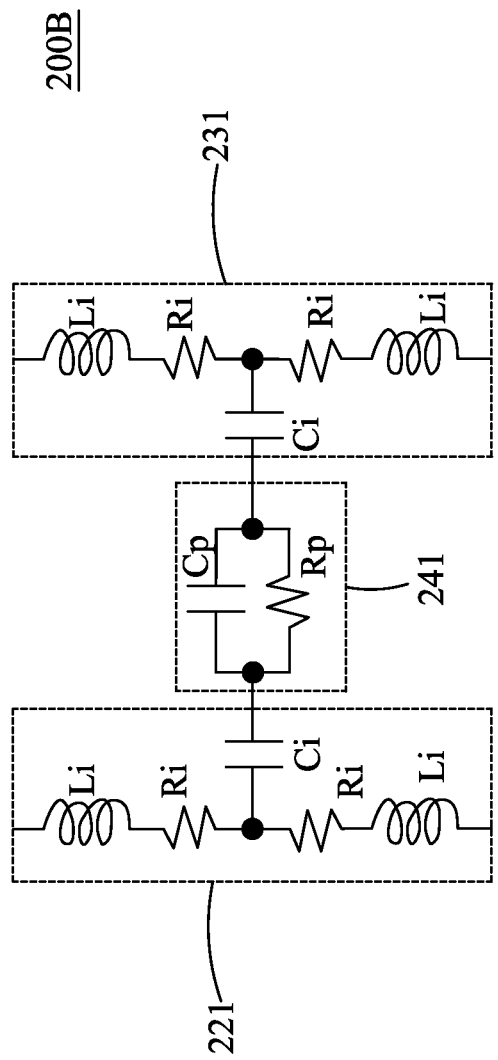
FIG. 2B is a model of the semiconductor device in accordance with some embodiments.

FIG. 2B is a model 200B of the semiconductor device semiconductor device 200A in accordance with some embodiments. In the model 200B, each of the TSVs 220, 230 is represented by a corresponding model 221, 231, and the coupling 240 is represented by a model 241.

Each of the models 221, 231 includes a plurality of intrinsic parameters of the corresponding TSV 220, 230, i.e., one or more intrinsic resistance Ri, one or more intrinsic inductance Li, and one or more intrinsic capacitance Ci. Specifically, a serial connection of two intrinsic inductances Li and two intrinsic resistances Ri positioned between the intrinsic inductances Li represents the conductive via 222 or 232 of the TSV 220 or 230. An intrinsic capacitance Ci, which is connected to a midpoint between the two intrinsic resistances Ri in the serial connection, represents the liner 224 or 234. In one or more embodiments, the model 221 or 231 does not include one or more of an intrinsic resistance Ri, an intrinsic inductance Li, or an intrinsic capacitance Ci. In one or more embodiments, different arrangements and/or connections among the intrinsic resistance Ri, intrinsic inductance Li, and/or intrinsic capacitance Ci are used. In one or more embodiments, the semiconductor device 200A includes one or more electrical components other than TSVs, and suitable models representing such electrical components are used in the model 200B.

The model 241 includes a plurality of parasitic parameters of the coupling 240, i.e., a parasitic resistance Rp and a parasitic capacitance Cp coupled in parallel with each other. The parallel connection of the parasitic resistance Rp and a parasitic capacitance Cp is serially coupled between the intrinsic capacitances Ci of the models 221 and 231 to reflect the nature of the coupling 240 between the TSVs 220, 230. The inclusion of both a parasitic resistance Rp and a parasitic capacitance Cp in the model 241 permits the model 241 to represent semiconductor properties of the semiconductor substrate 210 and/or coupling noise at high frequencies for accurate simulation results. In one or more embodiments, the model 241 further includes a parasitic inductance. In one or more embodiments, different arrangements and/or connections among the parasitic resistance Rp, parasitic capacitance Cp and/or parasitic inductance are used.

In some embodiments, one or more of the models 221, 231, 241 are included in a simulation tool, such as a simulation tool used for a post-layout simulation as described with respect to FIG. 1. The simulation tool is arranged to extract, using corresponding models, intrinsic parameters of various electrical components indicated in the netlist provided by an LVS extraction tool. However, the parasitic parameters in the model 241 of the coupling 240 are dependent on a distance between the corresponding electrical components, such as the distance d between the TSVs 220, 230 as described with respect to FIG. 2. In situations where the netlist provided by the LVS extraction tool does not indicate the distance between electrical components, the simulation tool does not have sufficient information to accurately extract the parasitic parameters of the coupling 240. On the other hand, an RC extraction tool is configured to extract distances between electrical components with higher accuracy than the LVS extraction tool.

Thus, some embodiments provide a design method and system which take advantage of both (i) the capability of a first tool, e.g., an RC extraction tool, to accurately determine a distance between electrical components in a semiconductor substrate, and (ii) the accuracy of a model included in a second, different tool, e.g., a simulation tool, to represent a coupling in the semiconductor substrate between the electrical components.

Figure 3:
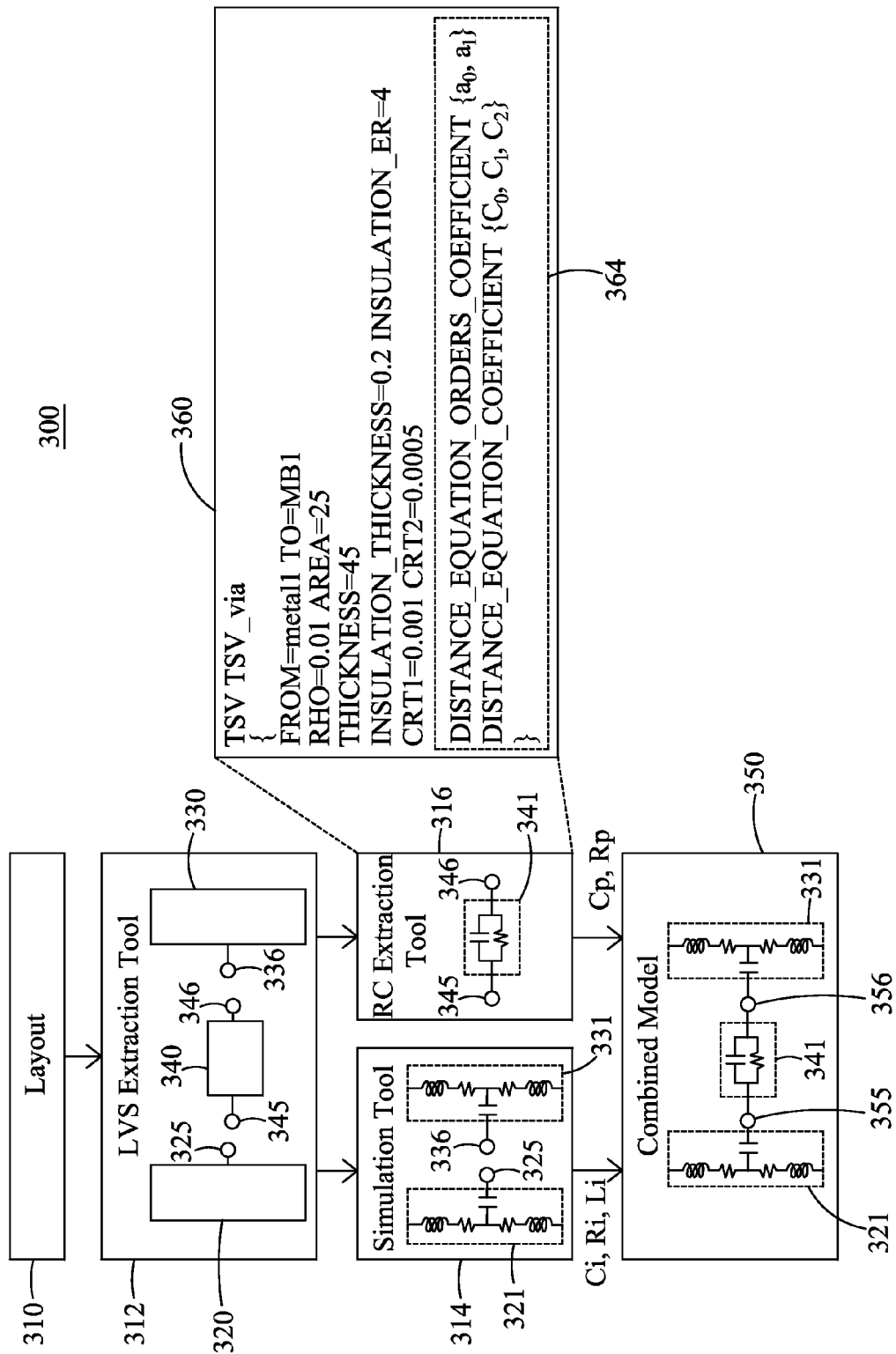
FIG. 3 is a block diagram of a design system in accordance with some embodiments.

FIG. 3 is a block diagram of a semiconductor device design system 300 in accordance with some embodiments. The design system 300 is arranged to perform pre-manufacture testing and checking on a layout 310 of a semiconductor device. For this purpose, the design system 300 includes an LVS extraction tool 312, a simulation tool 314 and an RC extraction tool 316. In one or more embodiments, the LVS extraction tool 312 and/or the simulation tool 314 is/are omitted from the design system 300. One or more other tools, such as a layout generation tool, a DRC tool etc. are included in the design system 300 in accordance with further embodiments.

In one or more embodiments, the design system 300 is implemented by a computer system as described herein below with respect to FIG. 6. A processor of such a computer system is hardwired and/or programmed to function as one or more of the tools of the design system 300.

In one or more embodiments, the design system 300 is implemented by several computer systems. A processor of each computer system is hardwired and/or programmed to function as one or more of the tools of the design system 300. For example, the LVS extraction tool 312 is implemented by one computer system, whereas the simulation tool 314 and RC extraction tool 316 are implemented by another computer system. In one or more embodiments, data exchange between the computer systems occurs over a network that connects the computer systems. Other modes of data exchange such as emails, external hard drives are usable in further embodiments.

In one or more embodiments, a tool of the design system 300, e.g., the simulation tool 316, is implemented by several processors and/or computer systems. Other arrangements are usable in further embodiments.

In the design system 300, the layout 310 is inputted into the LVS extraction tool 312 which performs an LVS extraction on the layout 310 and outputs a netlist, as described with respect to FIG. 1. The netlist represents electrical components and couplings therebetween as recognized by the LVS extraction tool 312. The LVS extraction tool 312 further inserts a plurality of pins to represent hierarchical connections between the recognized components and couplings. For example, when the layout 310 of a semiconductor device similar to the semiconductor device 200A is inputted into the LVS extraction tool 312, the LVS extraction tool 312 recognizes two electrical components 320 and 330 and a coupling 340 therebetween. The LVS extraction tool 312 further inserts a pin 325 for the electrical component 320, a pin 336 for the electrical component 330, and pins 345, 346 for the coupling 340. The pins 325 and 345 indicate a connection between the electrical component 320 and the coupling 340. The pins 336 and 346 indicate a connection between the electrical component 330 and the coupling 340. The recognized electrical components 320, 330 and coupling 340 and the corresponding pins 325, 336, 345, 346 are included in the netlist outputted by the LVS extraction tool 312. However, in one or more embodiments, a distance between the recognized electrical components 320, 330 is not indicated in the netlist, due to, e.g., a limitation of the LVS extraction tool 312 in determining distances between electrical components.

The netlist is supplied from the LVS extraction tool 312 to the simulation tool 314. The simulation tool 314 includes corresponding models for the recognized electrical components 320, 330, and coupling 340. For example, the simulation tool 314 recognizes from the netlist that the electrical components 320, 330 are TSVs, provides corresponding TSV models 321, 331 for the electrical components 320, 330 as described with respect to FIG. 2B, and uses the TSV models 321, 331 to extract intrinsic parameters Ci, Ri, Li for each of the TSVs. The simulation tool 314 also includes a model 341 for the coupling 340 as described with respect to FIG. 2B. However, in one or more embodiments, the simulation tool 314 does not use the model 341 to extract parasitic parameters of the coupling 340, due to, e.g., the netlist lacking accurate data on the distance between the electrical components 320, 330. Instead, the model 341 is provided to the RC extraction tool 316 for parasitic parameter extraction.

The RC extraction tool 316 is arranged to receive the netlist from the LVS extraction tool 312. In some embodiments, the RC extraction tool 316 is further arranged to receive the layout 310. The RC extraction tool 316 uses the layout 310 and the netlist to extract distances between the electrical components. For example, when the layout 310 of a semiconductor device similar to the semiconductor device 200A and the corresponding netlist are inputted into the RC extraction tool 316, the RC extraction tool 316 extracts the distance d between the electrical components 320, 330. The RC extraction tool 316 then uses the extracted distance and the model 341 provided by the simulation tool 314 to determine parasitic parameters Cp, Rp of the coupling 340. The extracted or determined parasitic parameters Cp, Rp of the coupling 340 are added to the netlist provided by the LVS extraction tool 312, and the modified netlist is used in a subsequent post-layout simulation as described with respect to FIG. 1.

In the post-layout simulation, the design system 300 combines the models 321, 331, 341 with the extracted intrinsic parameters Ci, Ri, Li and parasitic parameters Cp, Rp together into a combined model 350 for the semiconductor device represented by the layout 310. The pins inserted by the LVS extraction tool 312 are used for the combination. For example, the pins 325, 345 associated with the electrical component 320 and coupling 340 are combined together at 355 in the combined model 350 to connect the corresponding models 321, 341. Similarly, the pins 336, 346 associated with the electrical component 330 and coupling 340 are combined together at 356 in the combined model 350 to connect the corresponding models 331, 341. The combined model 350 and/or portions thereof are used in the post-layout simulation to check whether the semiconductor device meets a certain specification. In some embodiments, the post-layout simulation is performed by the simulation tool 314. Another simulation tool is usable in further embodiments. The simulation tool 314, in one or more embodiments, is a SPICE tool.

In some embodiments, the model 341 of the coupling 340 is provided from the simulation tool 314 to the RC extraction tool 316 by way of modifying a technology file 360 of the RC extraction tool 316. A part of the technology file 360 is shown in FIG. 3. The technology file 360 is modified to include additional instructions 364 which reflect the model 341 included in the simulation tool 314. The model 341 is, for example, a SPICE model including a parasitic resistance Rp and a parasitic capacitance Cp coupled in parallel as described with respect to FIG. 2B. The parasitic capacitance Cp is expressed in accordance with the SPICE model as follows:

$$C_p = C_0 + C_1 * C_2 ** (a_1 * tdis + a_0)$$

where "tdis" is the distance between the electrical components (e.g., TSVs), and $C_0$, $C_1$, $C_2$, $a_1$, $a_0$ are various coefficients that reflect the material of the semiconductor substrate and/or the frequency at which the semiconductor device is to be simulated. In accordance with some embodiments, different equations are usable for different semiconductor substrate materials. The added instructions 364 introduce the coefficients $C_0$, $C_1$, $C_2$, $a_1$, $a_0$ into the technology file 360 for use by the RC extraction tool 316 in the calculation of the parasitic capacitance Cp. The distance between the electrical components is extracted by the RC extraction tool 316 as described above. The same instructions 364 are usable to calculate parasitic capacitances between different pairs of electrical components depending on the different distances between the electrical components of the pairs of electrical components. Similar changes to the technology file 360 are made to incorporate appropriate coefficients and/or equation for calculation of the parasitic resistance Rp in accordance with the model 341 of the simulation tool 314 and the distance between the electrical components is extracted by the RC extraction tool 316.

In some embodiments, the model 341 of the coupling 340 is not necessarily provided from the simulation tool 314 to the RC extraction tool 316. Instead, an Application Programming Interface (API) is provided between the simulation tool 314 and the RC extraction tool 316. The distance between electrical components is extracted by the RC extraction tool 316 and sent to the simulation tool 314 via the API. The simulation tool 314 uses the inputted distance and the model 341 included in the simulation tool 314 to calculate the parasitic parameters Rp, Cp of the coupling 340. The calculated parasitic parameters Rp, Cp are returned to the RC extraction tool 316 to be added, by the RC extraction tool 316, to the netlist which is subsequently supplied to a post-layout simulation tool. In one or more embodiments, the simulation tool 314 directly uses the extracted parasitic parameters, without returning them to the RC extraction tool 316, for a post-layout simulation.

In some embodiments, the simulation tool 314 does not necessarily use the models 321, 331 of the electrical components 320, 330 included in the simulation tool 314 to extract intrinsic parameters of the electrical components. Instead, the simulation tool 314 uses one or more models inputted by a user for the corresponding electrical components.

Figure 4:
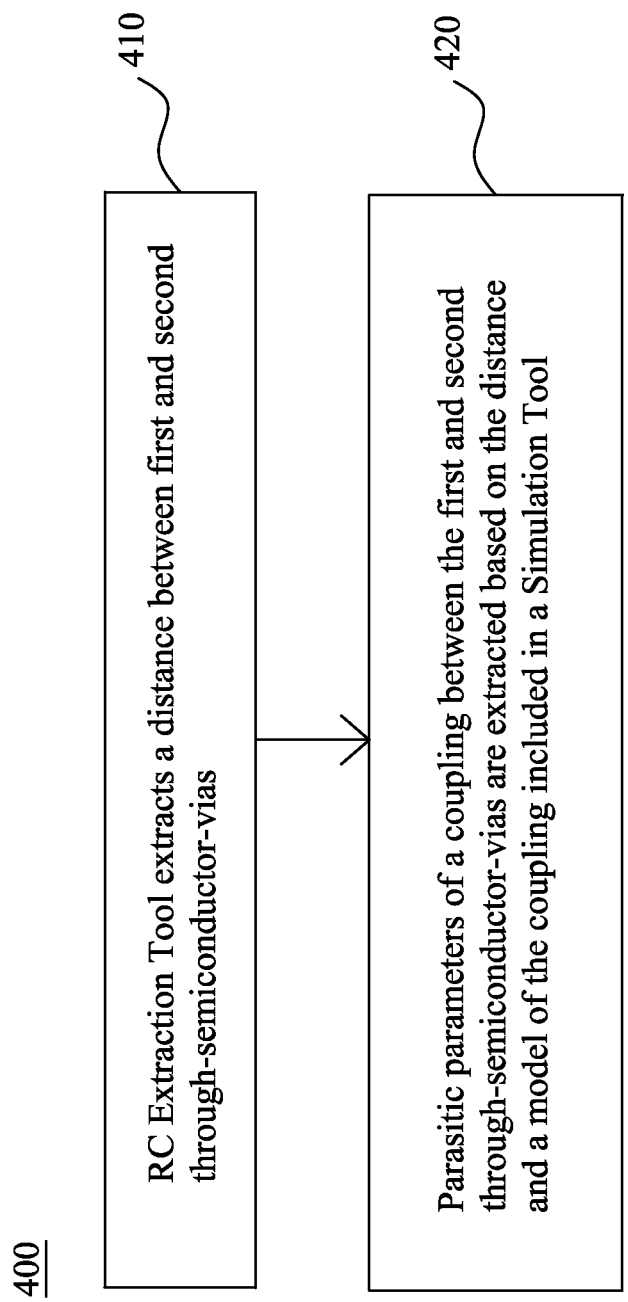
FIGS. 4-5 are flow charts of various design methods in accordance with some embodiments.

FIG. 4 is a flow chart of a semiconductor device design method 400 in accordance with some embodiments. The method 400 is performed by one or more processors of one or more computer systems as described herein after with respect to FIG. 6. The one or more processors are hardwired and/or programmed to define at least an RC extraction tool.

At operation 410, the RC extraction tool determines a distance between first and second TSVs extracted from a layout of a semiconductor device which includes a semiconductor substrate in which the first and second TSVs are embedded. For example, the semiconductor device is an interposer, as described with respect to FIG. 2A, which includes the TSVs 220, 230 embedded in the semiconductor substrate 210 and having therebetween the coupling 240. A layout of the interposer is supplied to the RC extraction tool which extracts the distance between the TSVs, as described with respect to the RC extraction tool 316 in FIG. 3.

At operation 420, parasitic parameters of the coupling in the semiconductor substrate between the TSVs are extracted based on the distance determined by the RC extraction tool and a model of the coupling included in a simulation tool. For example, the model 341 included in the simulation tool 314 is used, together with the determined distance between the TSVs, to extract parasitic parameters of the coupling between the TSVs. The model of the coupling is either included in a technology file of the RC extraction tool or accessed via an API as described with respect to FIG. 3. In some embodiments, one or more additional operations, such as pre-layout simulation, post-layout simulation, LVS extraction, DRC verification, etc., are performed before and/or after and/or between operations 410, 420, as described with respect to FIG. 1.

Figure 5:
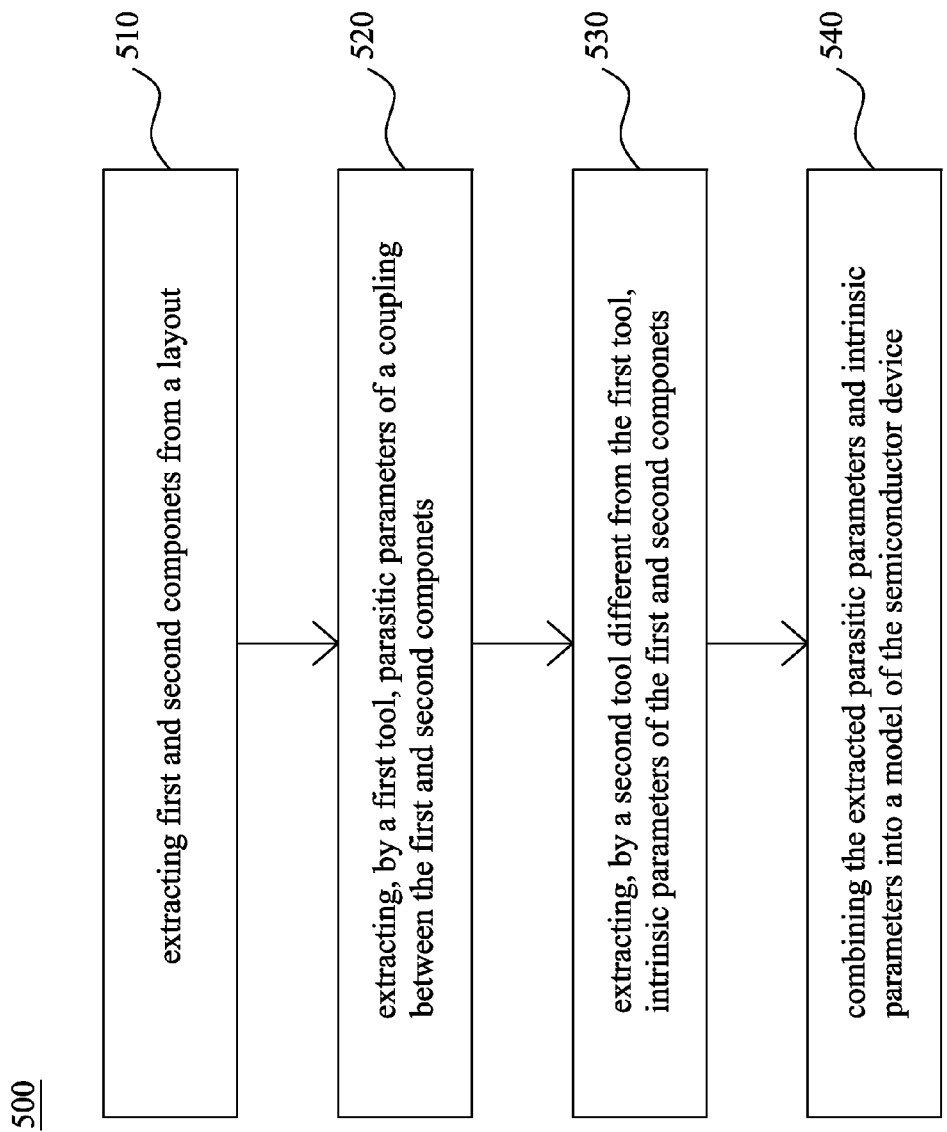

FIG. 5 is a flow chart of a semiconductor device design method 500 in accordance with some embodiments. The method 500 is performed by one or more processors of one or more computer systems as described herein after with respect to FIG. 6.

At operation 510, first and second electrical components are extracted from a layout. For example, as described with respect to FIG. 3, first and second electrical components 320, 330 are extracted from a layout 310 by an LVS extraction tool 312.

At operation 520, parasitic parameters of a coupling between the first and second electrical components are extracted using a first tool. For example, as described with respect to FIG. 3, parasitic parameters Rp, Cp of a coupling 340 between the first and second electrical components 320, 330 are extracted using an RC extraction tool 316. The parasitic parameter extraction is performed using a model of the coupling included in a second tool, such as a model 341 included in a simulation tool 314.

At operation 530, intrinsic parameters of the first and second electrical components are extracted using the second tool. For example, as described with respect to FIG. 3, intrinsic parameters Li, Ci, Ri of the first and second electrical components 320, 330 are extracted using the simulation tool 314.

At operation 540, the extracted parasitic parameters and intrinsic parameters are combined into a model of the semiconductor device. For example, as described with respect to FIG. 3, the extracted parasitic parameters and intrinsic parameters are combined into a model 350 of the semiconductor device. In some embodiments, one or more additional operations, such as pre-layout simulation, post-layout simulation, DRC verification, etc., are performed before and/or after and/or between operations 510-540, as described with respect to FIG. 1.

In accordance with some embodiments, semiconductor device design method and/or system is/are provided to be quickly adapted to provide an accurate model of the electrical components and couplings therebetween in a semiconductor device having a semiconductor substrate. For this purpose, in one or more embodiments, the technology file of a first tool, e.g., an RC extraction tool, is simply modified to include instructions and/or coefficients that reflect a model included in a second different tool, e.g., a simulation tool. When a different model is to be used and/or the semiconductor device is to be simulated at a different frequency, it is sufficient to update the corresponding instructions and/or coefficients in the technology file. Alternatively, in one or more embodiments, a distance between the electrical components is extracted by the first tool and inputted, e.g., via an API, into the second tool for parasitic parameter extraction. Thus, minimal changes, i.e., a modified technology file or an additional API, are made yet accurate modeling is achievable.

The model of the semiconductor device with the extracted parasitic parameters accurately reflects both the semiconductor properties of the semiconductor substrate, and various effects related to the operating frequency of the semiconductor device, especially in broadband (GHz) applications. Some embodiments are particularly useful for highly accurate RC extraction of TSVs and TSV-to-TSV couplings at different frequencies and/or for various semiconductor materials of the semiconductor substrate, including high-R substrates, Epi substrates, or doped substrates. Some embodiments are useful for RC extraction of not only TSVs, but also other electrical components embedded in a semiconductor substrate. Consistent parasitic parameter extraction is ensured for both GDS and Automatic Plate and Route (APR) design flows.

Figure 6:
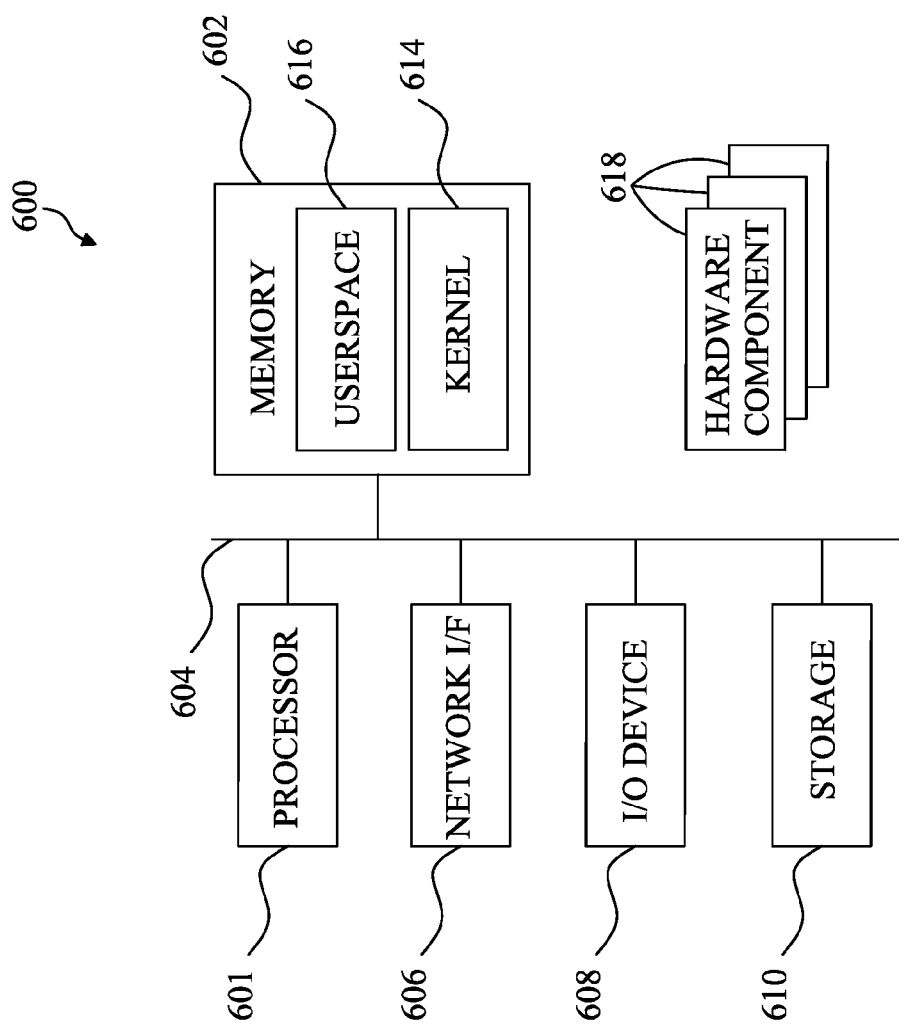
FIG. 6 is a block diagram of a computer system in accordance with some embodiments.

FIG. 6 is a block diagram of a computer system 600 in accordance with some embodiments. One or more of the tools and/or systems and/or operations described with respect to FIGS. 1-5 is realized in some embodiments by one or more computer systems 600 of FIG. 6. The system 600 comprises a processor 601, a memory 602, a network interface (I/F) 606, a storage 310, an input/output (I/O) device 608, and one or more hardware components 618 communicatively coupled via a bus 604 or other interconnection communication mechanism.

The memory 602 comprises, in some embodiments, a random access memory (RAM) and/or other dynamic storage device and/or read only memory (ROM) and/or other static storage device, coupled to the bus 604 for storing data and/or instructions to be executed by the processor 601, e.g., kernel 614, userspace 616, portions of the kernel and/or the userspace, and components thereof. The memory 602 is also used, in some embodiments, for storing temporary variables or other intermediate information during execution of instructions to be executed by the processor 601.

In some embodiments, a storage device 610, such as a magnetic disk or optical disk, is coupled to the bus 604 for storing data and/or instructions, e.g., kernel 614, userspace 616, etc. The I/O device 608 comprises an input device, an output device and/or a combined input/output device for enabling user interaction with the system 600. An input device comprises, for example, a keyboard, keypad, mouse, trackball, trackpad, and/or cursor direction keys for communicating information and commands to the processor 601. An output device comprises, for example, a display, a printer, a voice synthesizer, etc. for communicating information to a user.

In some embodiments, one or more operations and/or functionality of the tools and/or systems described with respect to FIGS. 1-5 are realized by the processor 601, which is programmed for performing such operations and/or functionality. One or more of the memory 602, the I/F 606, the storage 310, the I/O device 608, the hardware components 618, and the bus 604 is/are operable to receive instructions, data, design rules, netlists, layouts, models and/or other parameters for processing by the processor 601.

In some embodiments, one or more of the operations and/or functionality of the tools and/or systems described with respect to FIGS. 1-5 is/are implemented by specifically configured hardware (e.g., by one or more application specific integrated circuits or ASIC(s)) which is/are included) separate from or in lieu of the processor 601. Some embodiments incorporate more than one of the described operations and/or functionality in a single ASIC.

In some embodiments, the operations and/or functionality are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or other suitable non-transitory computer readable recording medium.

The above methods include exemplary operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within scope of the disclosure and will be apparent to those skilled in the art after reviewing this disclosure.

One aspect of this description relates to a semiconductor device design system comprising at least one processor configured to define a resistance-capacitance (RC) extraction tool for determining a distance between first and second through-semiconductor-vias extracted from a layout of a semiconductor device, the semiconductor device having a semiconductor substrate and the first and second through-semiconductor-vias in the semiconductor substrate. The semiconductor device design system is also configured to extract parasitic parameters of a coupling in the semiconductor substrate based on the distance determined by the RC extraction tool and a model of the coupling included in a simulation tool.

Another aspect of this description relates to a method comprising defining, by a processor, a resistance-capacitance (RC) extraction tool for determining a distance between first and second through-semiconductor-vias extracted from a layout of a semiconductor device, said semiconductor device having a semiconductor substrate and the first and second through-semiconductor-vias in the semiconductor substrate. The method also comprises extracting parasitic parameters a coupling in the semiconductor substrate based on the distance determined by the RC extraction tool and a model of the coupling included in a simulation tool.

A further aspect of this description relates to a non-transitory computer-readable medium containing therein instructions which, when executed by a computer, cause the computer to define a resistance-capacitance (RC) extraction tool for determining a distance between first and second through-semiconductor-vias extracted from a layout of a semiconductor device, said semiconductor device having a semiconductor substrate and the first and second through-semiconductor-vias in the semiconductor substrate. The computer is also caused to extract parasitic parameters of a coupling in the semiconductor substrate based on the distance determined by the RC extraction tool and a model of the coupling included in a simulation tool.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A semiconductor device design system, comprising at least one processor configured to:
  define a resistance-capacitance (RC) extraction tool for determining a distance between first and second through-semiconductor-vias extracted from a layout of a semiconductor device, said semiconductor device having a semiconductor substrate and the first and second through-semiconductor-vias in the semiconductor substrate; and extract parasitic parameters of a coupling in the semiconductor substrate based on the distance determined by the RC extraction tool and a model of the coupling included in a simulation tool.

2. The system of claim 1, wherein the RC extraction tool includes a technology file modified to include the model of the coupling included in the simulation tool.

3. The system of claim 1, wherein the at least one processor is further configured to:
input the determined distance between the first and second through-semiconductor-vias from the RC extraction tool into the simulation tool; and
return the extracted parasitic parameters calculated by the simulation tool, based on the inputted distance and the model of the coupling, back into the RC extraction tool.

4. The system of claim 1, wherein the at least one processor is further configured to:
define the simulation tool which further includes a model for each of the first and second through-semiconductor-vias;
extract intrinsic parameters of the first and second through-semiconductor-vias based on the corresponding models; and
perform a post-layout simulation using the models of the first and second through-semiconductor-vias and the coupling there between, and the extracted parasitic parameters and intrinsic parameters to determine whether the layout of the semiconductor device meets a predetermined specification.

5. The system of claim 1, wherein the at least one processor is further configured to:
receive user-defined models for the first and second through-semiconductor-vias;
extract intrinsic parameters of the first and second through-semiconductor-vias based on the corresponding models; and
perform a post-layout simulation using the models of the first and second through-semiconductor-vias and the coupling there between, and the extracted parasitic parameters and intrinsic parameters to determine whether the layout of the semiconductor device meets a predetermined specification.

6. The system of claim 1, wherein a model of the coupling is a Simulation Program with Integrated Circuit Emphasis (SPICE) model.

7. The system of claim 1, wherein a model of the semiconductor device is a SPICE model.

8. A method comprising:
defining, by a processor, a resistance-capacitance (RC) extraction tool for determining a distance between first and second through-semiconductor-vias extracted from a layout of a semiconductor device, said semiconductor device having a semiconductor substrate and the first and second through-semiconductor-vias in the semiconductor substrate; and
extracting parasitic parameters of a coupling in the semiconductor substrate based on the distance determined by the RC extraction tool and a model of the coupling included in a simulation tool.

9. The method of claim 8, wherein the RC extraction tool includes a technology file modified to include the model of the coupling included in the simulation tool.

10. The method of claim 8, further comprising:
inputting the determined distance between the first and second through-semiconductor-vias from the RC extraction tool into the simulation tool; and
returning the extracted parasitic parameters calculated by the simulation tool, based on the inputted distance and the model of the coupling, back into the RC extraction tool.

11. The method of claim 8, further comprising:
defining the simulation tool which further includes a model for each of the first and second through-semiconductor-vias;
extracting intrinsic parameters of the first and second through-semiconductor-vias based on the corresponding models; and
performing a post-layout simulation using the models of the first and second through-semiconductor-vias and the coupling there between, and the extracted parasitic parameters and intrinsic parameters to determine whether the layout of the semiconductor device meets a predetermined specification.

12. The method of claim 8, further comprising:
receiving user-defined models for the first and second through-semiconductor-vias;
extracting intrinsic parameters of the first and second through-semiconductor-vias based on the corresponding models; and
performing a post-layout simulation using the models of the first and second through-semiconductor-vias and the coupling there between, and the extracted parasitic parameters and intrinsic parameters to determine whether the layout of the semiconductor device meets a predetermined specification.

13. The method of claim 8, wherein a model of the coupling is a Simulation Program with Integrated Circuit Emphasis (SPICE) model.

14. The method of claim 8, wherein a model of the semiconductor device is a SPICE model.

15. A non-transitory computer-readable medium containing instructions therein which, when executed by a computer, cause the computer to:
define a resistance-capacitance (RC) extraction tool for determining a distance between first and second through-semiconductor-vias extracted from a layout of a semiconductor device, said semiconductor device having a semiconductor substrate and the first and second through-semiconductor-vias in the semiconductor substrate; and
extract parasitic parameters of a coupling in the semiconductor substrate based on the distance determined by the RC extraction tool and a model of the coupling included in a simulation tool.

16. The non-transitory computer-readable medium of claim 15, wherein the RC extraction tool includes a technology file modified to include the model of the coupling included in the simulation tool.

17. The non-transitory computer-readable medium of claim 15, wherein the computer is further caused to:
input the determined distance between the first and second through-semiconductor-vias from the RC extraction tool into the simulation tool; and
return the extracted parasitic parameters calculated by the simulation tool, based on the inputted distance and the model of the coupling, back into the RC extraction tool.

18. The non-transitory computer-readable medium of claim 15, wherein the computer is further caused to:

define the simulation tool which further includes a model for each of the first and second through-semiconductor-vias;

extract intrinsic parameters of the first and second through-semiconductor-vias based on the corresponding models; and perform a post-layout simulation using the models of the first and second through-semiconductor-vias and the coupling there between, and the extracted parasitic parameters and intrinsic parameters to determine whether the layout of the semiconductor device meets a predetermined specification.

19. The non-transitory computer-readable medium of claim 15, wherein the computer is further caused to:

receive user-defined models for the first and second through-semiconductor-vias, extract intrinsic parameters of the first and second through-semiconductor-vias based on the corresponding models, and perform a post-layout simulation using the models of the first and second through-semiconductor-vias and the coupling there between, and the extracted parasitic parameters and intrinsic parameters to determine whether the layout of the semiconductor device meets a predetermined specification.

20. The non-transitory computer-readable medium of claim 15, wherein the model of the coupling is a Simulation Program with Integrated Circuit Emphasis (SPICE) model.

* * * * *